US012697716B2

(12) United States Patent
Kanaoka et al.

(10) Patent No.: US 12,697,716 B2
(45) Date of Patent: Aug. 4, 2026

(54) PARALLEL LINK MECHANISM

(71) Applicant: Man-Machine Synergy Effectors, Inc., Shiga (JP)

(72) Inventors: Katsuya Kanaoka, Shiga (JP); Ying Zi Zhang, Shiga (JP)

(73) Assignee: Man-Machine Synergy Effectors, Inc., Shiga (JP)

( * ) Notice: Subject to any disclaimer, the term of this patent is extended or adjusted under 35 U.S.C. 154(b) by 0 days.

(21) Appl. No.: 18/841,866

(22) PCT Filed: Feb. 15, 2023

(86) PCT No.: PCT/JP2023/005208
§ 371 (c)(1),
(2) Date: Nov. 21, 2024

(87) PCT Pub. No.: WO2023/162816
PCT Pub. Date: Aug. 31, 2023

(65) Prior Publication Data
US 2025/0205878 A1 Jun. 26, 2025

(30) Foreign Application Priority Data

Feb. 28, 2022 (JP) ................................. 2022-029159

(51) Int. Cl.
*B25J 9/10* (2006.01)
*B25J 9/04* (2006.01)
*B25J 19/00* (2006.01)

(52) U.S. Cl.
CPC ............. B25J 9/1065 (2013.01); B25J 9/046 (2013.01); B25J 19/0016 (2013.01)

(58) Field of Classification Search
CPC ....... B25J 9/046; B25J 9/1065; B25J 19/0016
USPC ....................................................... 74/490.01
See application file for complete search history.

(56) References Cited

FOREIGN PATENT DOCUMENTS

| FR | 2637832 A1 * | 4/1990 | ......... B25J 19/0008 |
| JP | S59-66594 U | 5/1984 | |
| JP | H8-211173 A | 8/1996 | |
| JP | 2004-291171 A | 10/2004 | |

(Continued)

OTHER PUBLICATIONS

PCT/ISA/237 for PCT/JP2023/005208 (Year: 2022).*

(Continued)

*Primary Examiner* — T. Scott Fix
(74) *Attorney, Agent, or Firm* — Hodgson Russ LLP

(57) ABSTRACT

Provided is a parallel link mechanism that realizes both coupled drive and gravitationally decoupled reduction. The parallel link mechanism 10A includes a first parallel link portion 47 (40, 41, 42) swingably connected at a base end to a second movable body 30, a second parallel link portion 48 (42, 43, 44) swingably connected at a base end to a tip end of the first parallel link portion 47, a first arm portion 45 rotatably connected at a base end to a first movable body 20 and rotatably connected at a tip end to the second parallel link portion 48 at an intermediate position, a second arm portion 46a rotatably connected at a base end to the second movable body 30 and rotatably connected at a tip end to the first arm portion 45 at an intermediate position, and linear motion units 60 and 70 capable of moving the movable bodies 20 and 30 up and down individually. The second parallel link portion 48 is swingably connected at a tip end to an end-effector 50.

5 Claims, 7 Drawing Sheets

(56) References Cited

FOREIGN PATENT DOCUMENTS

| JP | 2020-128754 A | 8/2020 |
| JP | 2021-109253 A | 8/2021 |

OTHER PUBLICATIONS

Hirose, S., Compact and Light-weight Design of Robot Mechanism, Journal of the Japan Society for Precise Engineering, The Japan Society for Precise Engineering, 1994, vol. 60, No. 7, pp. 913-919.

* cited by examiner

[FIG. 1]
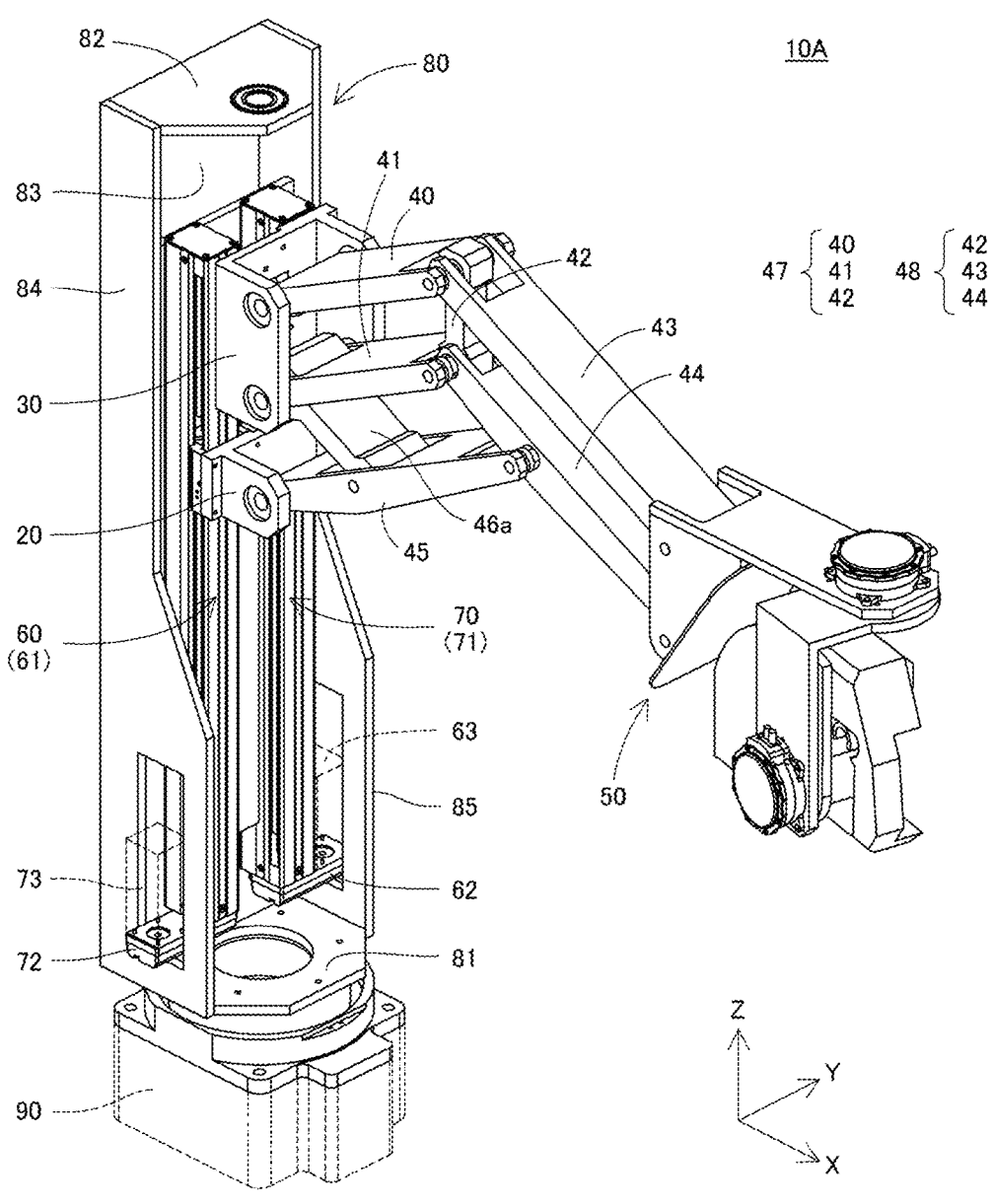

[FIG. 2]
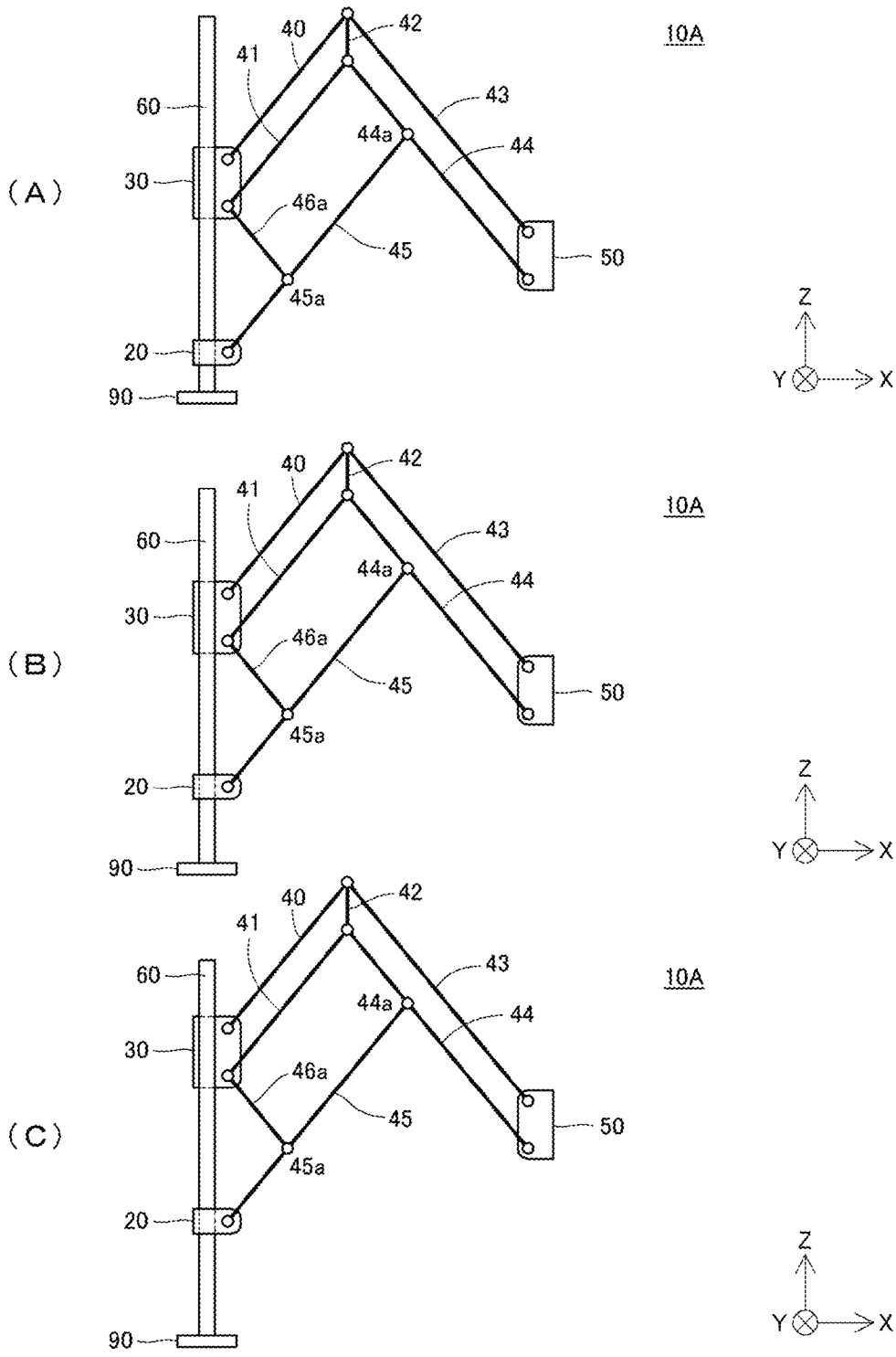

[FIG. 3]
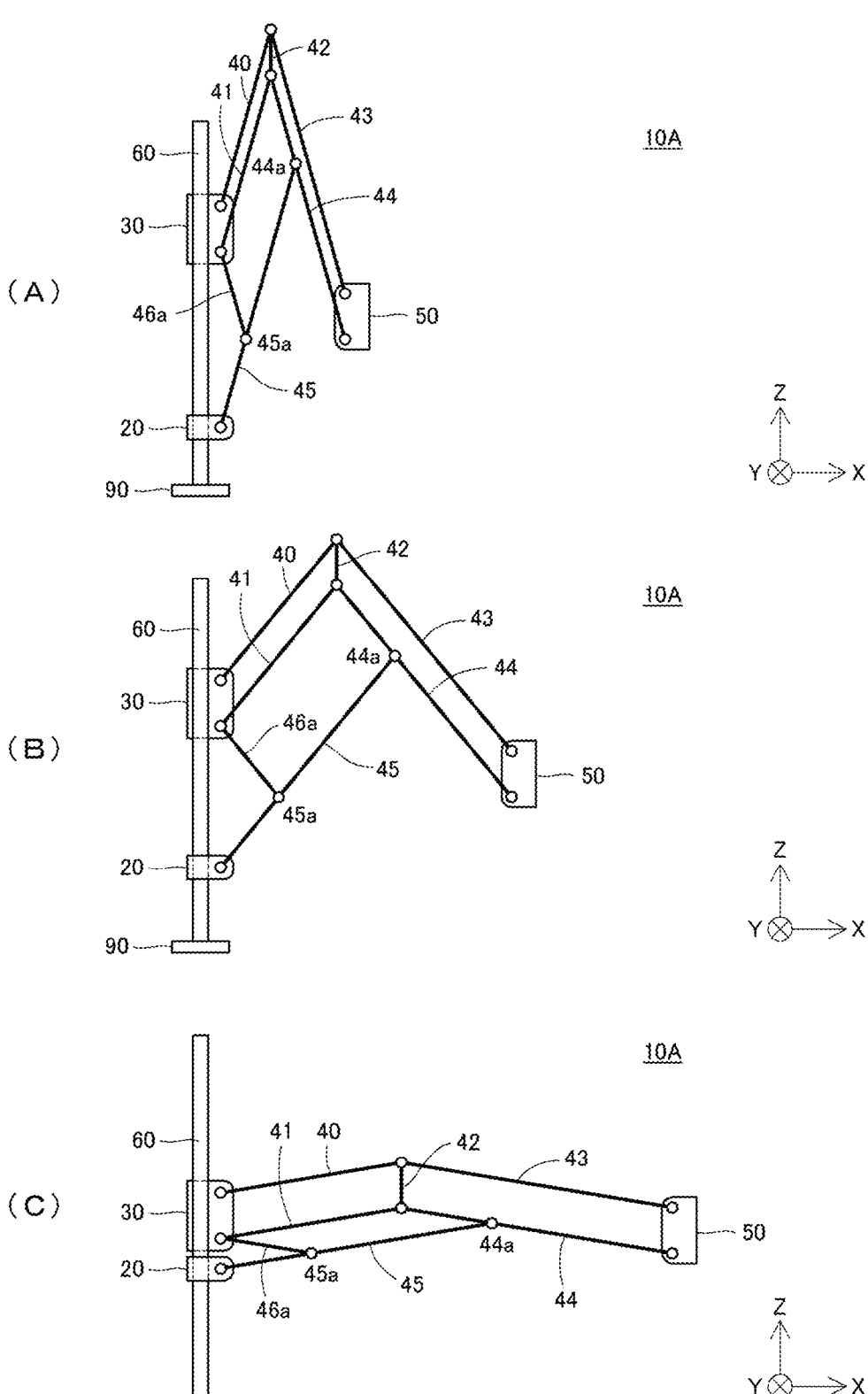

[FIG. 4]
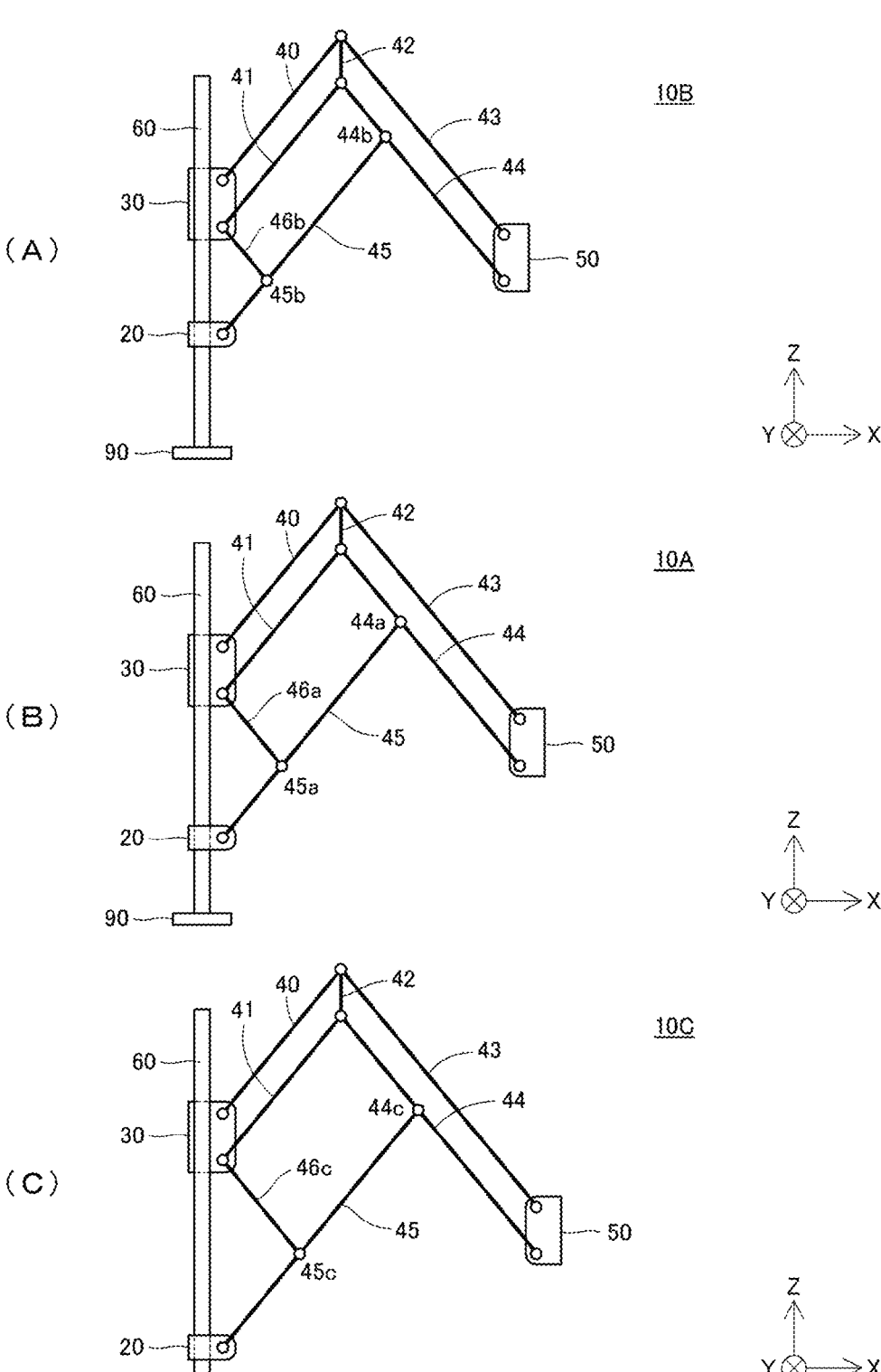

[FIG. 5]
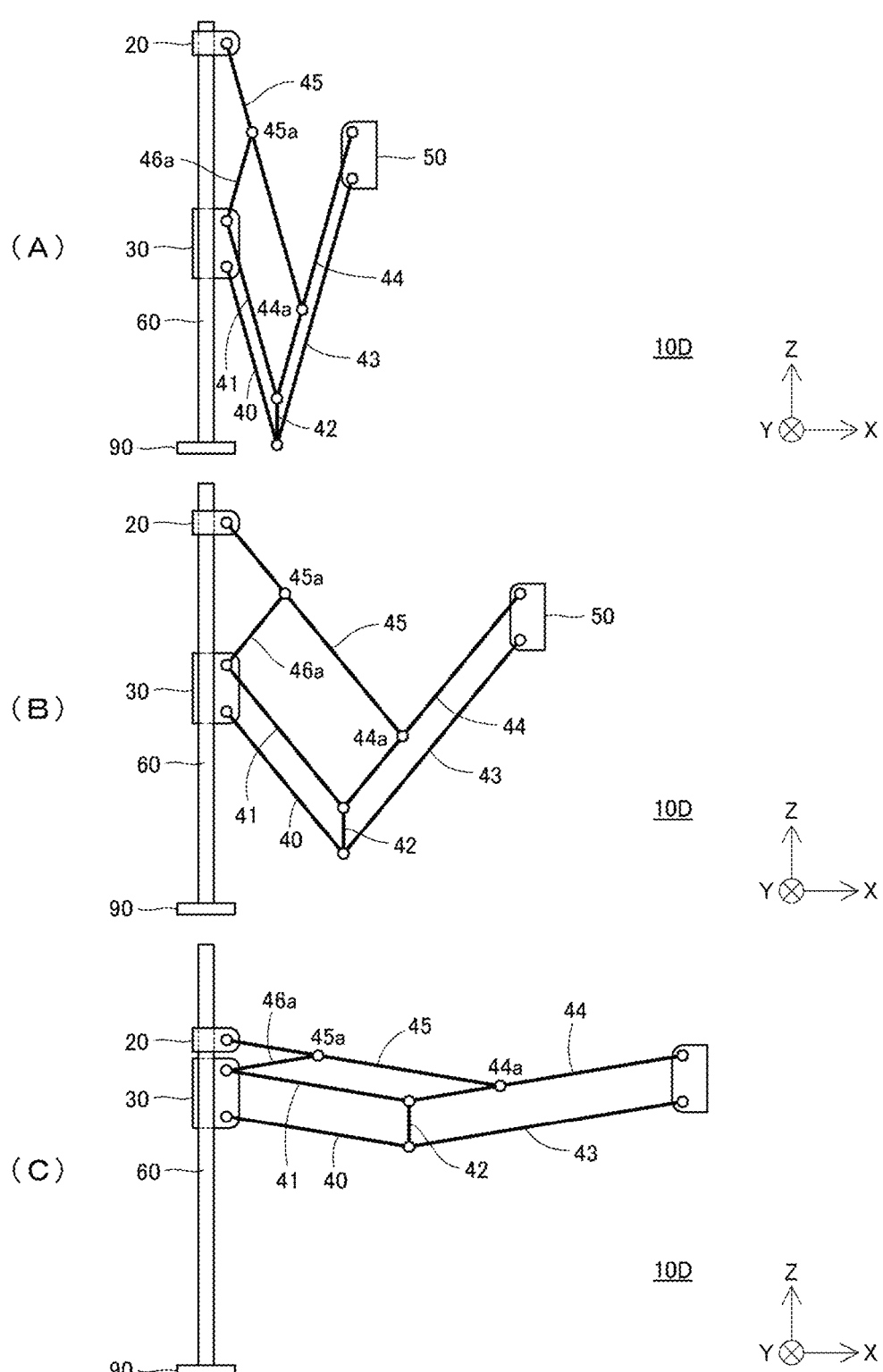

[FIG. 6]
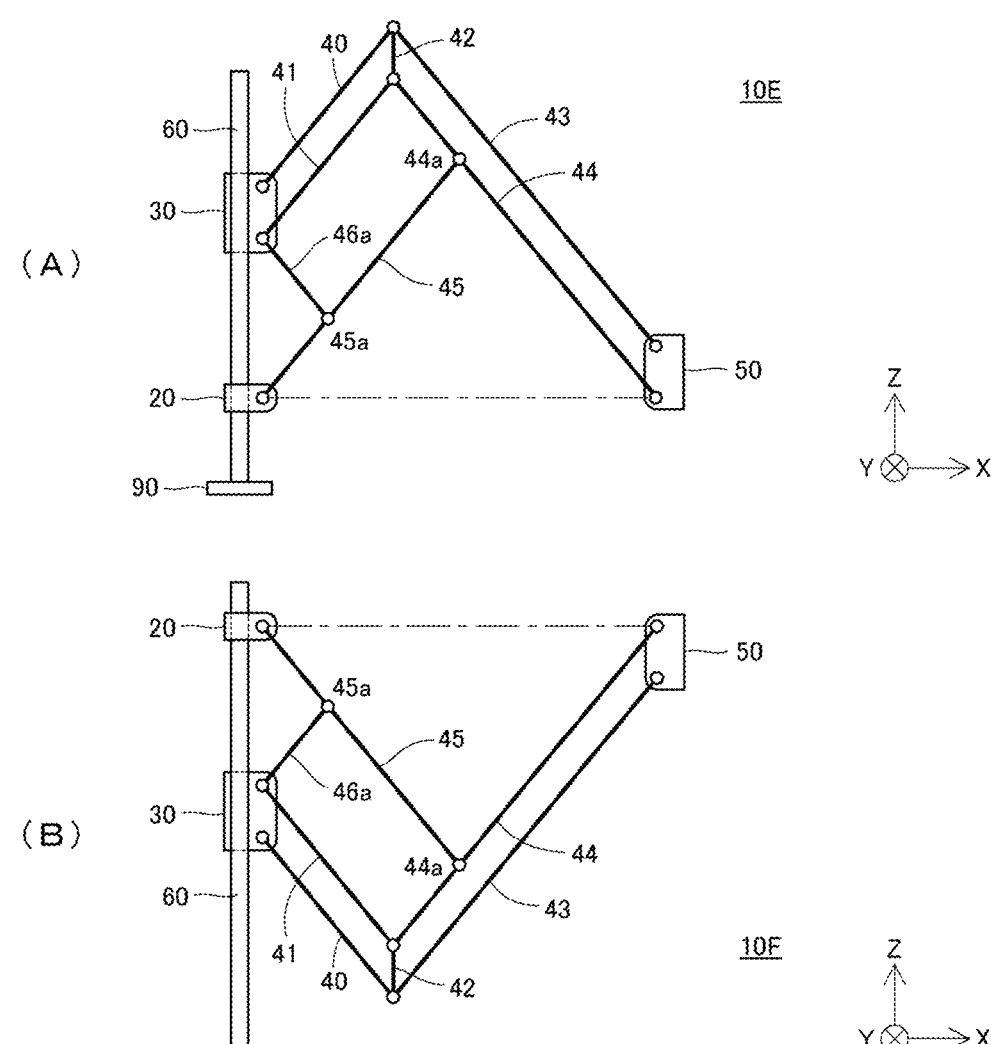

[FIG. 7]
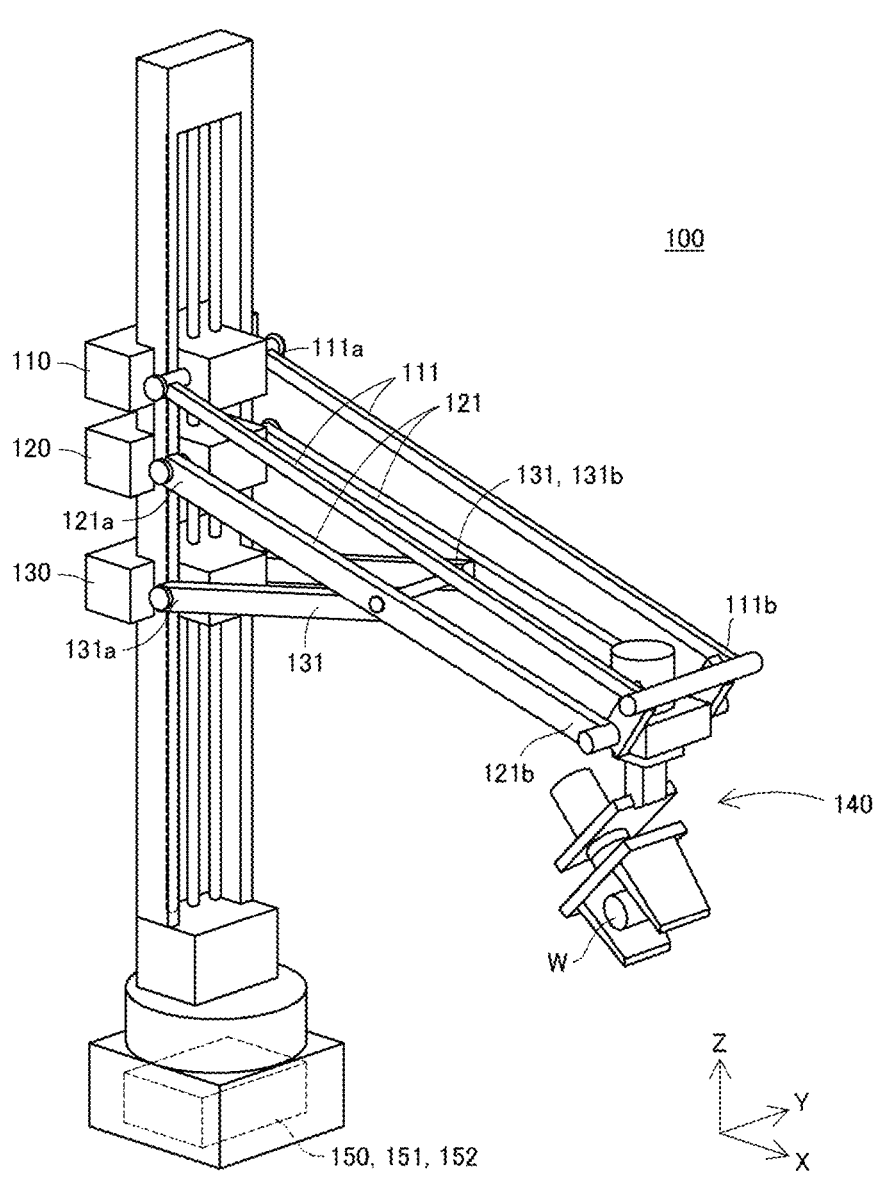

PARALLEL LINK MECHANISM

TECHNICAL FIELD

The present invention relates to a parallel link mechanism that can be used as a work arm for performing various tasks.

BACKGROUND ART

One conventional link mechanism that can be used as a work arm is a link mechanism 100 shown in FIG. 7 (see Patent Document 1). The link mechanism 100, devised by the present applicant, includes movable bodies 110, 120, and 130 positioned on the same virtual line extending in the direction of gravity, first arm portions 111 rotatably connected at first base ends 111a to the movable body 110, second arm portions 121 rotatably connected at second base ends 121a to the movable body 120, third arm portions 131 rotatably connected at third base ends 131a to the movable body 130 and rotatably connected at third tip ends 131b to the second arm portion 121 between the second base ends 121a and second tip ends 121b, a work device 140 rotatably connected to both first tip ends 111b and the second tip ends 121b, and rotation devices 150, 151, and 152 capable of moving the movable bodies 110, 120, and 130 individually along the virtual line. Reference character W denotes a work object.

In the link mechanism 100, the sum of forces generated by the three rotation devices 150, 151, and 152 acts as the force for lifting the work object W. In other words, the link mechanism 100 is capable of lifting the work object W by fully utilizing the forces generated by the three rotation devices 150, 151, and 152. On the other hand, the link mechanism 100 cannot adjust a horizontal (X-direction) reduction ratio independently of a gravitational-direction (Z-direction) reduction ratio.

That is, the conventional link mechanism 100 realizes "coupled drive" but not "gravitationally decoupled reduction (GDR)". Note that coupled drive is explained in Non-Patent Document 1. Moreover, gravitationally decoupled reduction (GDR), defined for the first time herein by the present applicant, is a concept similar to "gravitationally decoupled actuation (GDA)" explained in Non-Patent Document 1. While GDA is a concept referring to decoupling drive actuators in gravitational and non-gravitational directions, GDR refers to decoupling (or individually designing) reduction ratios in gravitational and non-gravitational directions. This definition considers GDR a prerequisite for GDA. Moreover, the definition does not accommodate the realization of GDA simultaneously with the use of coupled drive in the same gravitational and non-gravitational directions, but the definition does not necessarily consider it contradictory to realize GDR simultaneously with the use of coupled drive in the same gravitational and non-gravitational directions. That is, both coupled drive and GDR can be realized at the same time.

PRIOR ART DOCUMENTS

Patent Document

Patent Document 1: Japanese Laid-Open Patent Publication No. 2021-109253

Non-Patent Document

Non-Patent Document 1: Shigeo Hirose, "Compact and Light-weight Design of Robot Mechanism", Journal of the Japan Society for Precise Engineering, The Japan Society for Precise Engineering, 1994, Vol. 60, No. 7, pp. 913-919

DISCLOSURE OF THE INVENTION

Problems to be Solved by the Invention

The present invention has been achieved under the above circumstances, with a problem thereof being to provide a parallel link mechanism that realizes both coupled drive and gravitationally decoupled reduction.

Solution to the Problems

To solve the above problem, a parallel link mechanism according to the present invention includes a first movable body and a second movable body positioned on the same virtual line, a first parallel link portion having a first base end and a first tip end and swingably connected at the first base end to the second movable body, a second parallel link portion having a second base end and a second tip end and swingably connected at the second base end to the first tip end of the first parallel link portion, a first arm portion having a third base end and a third tip end, rotatably connected at the third base end to the first movable body, and rotatably connected at the third tip end to the second parallel link portion at a first intermediate position between the second base end and the second tip end, a second arm portion having a fourth base end and a fourth tip end, rotatably connected at the fourth base end to the second movable body, and rotatably connected at the fourth tip end to the first arm portion at a second intermediate position between the third base end and the third tip end, and linear motion means capable of moving the first movable body and the second movable body individually along the virtual line, and the second parallel link portion is swingably connected at the second tip end to an end-effector.

The parallel link mechanism can be configured, for example, such that the linear motion means includes a first ball screw shaft and a second ball screw shaft parallel to the virtual line, and a first rotation device and a second rotation device connected one-to-one with the first ball screw shaft and the second ball screw shaft, respectively, the first ball screw shaft is threaded in the first movable body but not in the second movable body, and the second ball screw shaft is threaded in the second movable body but not in the first movable body.

The parallel link mechanism may further include a base portion placed on a floor surface, and a pillar portion extending vertically upward from the base portion and including the linear motion means.

In the parallel link mechanism, the base portion preferably includes a third rotation device connected to the pillar portion.

The parallel link mechanism preferably further includes a first constant-force spring exerting a constant vertically upward force on the first movable body regardless of displacement of the first movable body, and a second constant-force spring exerting a constant vertically upward force on the second movable body regardless of displacement of the second movable body.

The parallel link mechanism is preferably configured such that the first parallel link portion includes a first link member rotatably connected at one end to the second movable body, a second link member rotatably connected at one end to the second movable body, and a third link member connected to other ends of the first and second link members, the second parallel link portion includes a fourth link member and a fifth link member, with the fourth link member being rotatably connected at one end to the other end of the first link member and rotatably connected at another end to the end-effector, and the fifth link member being rotatably connected at one end to the other end of the second link member and rotatably connected at another end to the end-effector, the first link member, the second link member, and the first arm portion are parallel to one another, the fourth link member, the fifth link member, and the second arm portion are parallel to one another, the third link member, a line defined on the second movable body by connecting two rotation axes, and a line defined on the end-effector by connecting two rotation axes are parallel to one another, distancing between the fourth base end and the fourth tip end is equal to distancing between the third base end and the second intermediate position, and the fifth link member and the end-effector are connected at a point in the same plane as the second intermediate position, the plane being perpendicular to the virtual line.

Effect of the Invention

The present invention makes it possible to provide a parallel link mechanism that realizes both coupled drive and gravitationally decoupled reduction.

BRIEF DESCRIPTION OF THE DRAWINGS

FIG. 1 is an oblique view illustrating a parallel link mechanism according to a first embodiment of the present invention.

FIG. 2 provides schematic side views illustrating the operation of moving an end-effector of the parallel link mechanism according to the first embodiment of the invention in a Z direction.

FIG. 3 provides schematic side views illustrating the operation of moving the end-effector of the parallel link mechanism according to the first embodiment of the invention in an X direction.

FIG. 4 provides (A) a schematic side view illustrating a parallel link mechanism according to a second embodiment of the invention, (B) a schematic side view illustrating the parallel link mechanism according to the first embodiment of the invention, and (C) a schematic side view illustrating a parallel link mechanism according to a third embodiment of the invention.

FIG. 5 provides schematic side views illustrating the operation of moving an end-effector of a parallel link mechanism according to a fourth embodiment of the invention in the X direction.

FIG. 6 provides schematic side views of parallel link mechanisms according to variants of the invention.

FIG. 7 is an oblique view illustrating a conventional link mechanism.

MODES FOR CARRYING OUT THE INVENTION

Hereinafter, embodiments of a parallel link mechanism according to the present invention will be described with reference to the accompanying drawings. Note that the following description pertains to the case where the parallel link mechanism according to the present invention is used as a work arm, but the parallel link mechanism can also be used as a part of other types of robots.

First Embodiment

FIG. 1 illustrates a parallel link mechanism 10A according to a first embodiment of the present invention. The parallel link mechanism 10A is capable of moving an arbitrary end-effector 50 to any position within a movable range thereof in an XYZ space. As shown in the figure, the parallel link mechanism 10A includes a base portion 90 placed on a floor surface, a pillar portion 80, two movable bodies 20 and 30, and seven link members 40, 41, 42, 43, 44, 45, and 46*a*. In the present embodiment, it is assumed that the floor surface is parallel to the horizontal XY plane, and that the Z direction, which is perpendicular to the X and Y directions, corresponds to the direction of gravity (i.e., the vertical direction).

The pillar portion 80 extends from the base portion 90 in the +Z direction. The pillar portion 80 includes a bottom section 81, a ceiling section 82 spaced apart from the bottom section 81 in the +Z direction, a back wall 83 and side walls 84 and 85 linking the bottom section 81 and the ceiling section 82, a first linear motion unit 60, and a second linear motion unit 70. The two side walls 84 and 85 are spaced apart in the Y direction with the linear motion units 60 and 70 positioned therebetween. The linear motion units 60 and 70 are also spaced apart in the Y direction.

The pillar portion 80 is connected at the bottom section 81 to the base portion 90 so as to be rotatable about the Z axis. The following descriptions assume that, when the pillar portion 80 rotates relative to the base portion 90, the orientations of the X and Y axes change correspondingly. In other words, it is assumed that the linkage that consists of the seven link members 40, 41, 42, 43, 44, 45, and 46*a* always extends from the pillar portion 80 in the +X direction.

The first linear motion unit 60 includes a first ball screw shaft 61 extending in the Z direction, a first reduction device 62 connected to a lower end of the first ball screw shaft 61, and a first rotation device 63 with an output shaft connected to the first reduction device 62. That is, the output shaft of the first rotation device 63 is connected to the first ball screw shaft 61 through the first reduction device 62. Accordingly, when the output shaft of the first rotation device 63 rotates, the first ball screw shaft 61 also rotates in a direction corresponding to the direction of rotation of the output shaft. In this case, the first ball screw shaft 61 and the output shaft of the first rotation device 63 may rotate at the same number of rotations or at a different number of rotations.

The second linear motion unit 70 has a similar configuration to that of the first linear motion unit 60. Specifically, the second linear motion unit 70 includes a second ball screw shaft 71 extending in the Z direction, a second reduction device 72 connected to a lower end of the second ball screw shaft 71, and a second rotation device 73 with an output shaft connected to the second reduction device 72. That is, the output shaft of the second rotation device 73 is connected to the second ball screw shaft 71 through the second reduction device 72. Accordingly, when the output shaft of the second rotation device 73 rotates, the second ball screw shaft 71 also rotates in a direction corresponding to the direction of rotation of the output shaft. In this case, the second ball screw shaft 71 and the output shaft of the second rotation device 73 may rotate at the same number of rotations or at a different number of rotations.

The first movable body 20 is threaded on the first ball screw shaft 61 of the first linear motion unit 60. Accordingly, when the first ball screw shaft 61 rotates, the first movable body 20 moves at a speed corresponding to the number of rotations of the first ball screw shaft 61 and in a direction (either the +Z or −Z direction) corresponding to the direction of rotation of the first ball screw shaft 61. On the other hand, the first movable body 20 is not threaded on the second ball screw shaft 71 of the second linear motion unit 70. Accordingly, the rotation of the second ball screw shaft 71 does not affect the first movable body 20.

The second movable body 30 is threaded on the second ball screw shaft 71 of the second linear motion unit 70 above the first movable body 20. Accordingly, when the second ball screw shaft 71 rotates, the second movable body 30 moves at a speed corresponding to the number of rotations of the second ball screw shaft 71 and in a direction (either the +Z or −Z direction) corresponding to the direction of rotation of the second ball screw shaft 71. On the other hand, the second movable body 30 is not threaded on the first ball screw shaft 61 of the first linear motion unit 60. Accordingly, the rotation of the first ball screw shaft 61 does not affect the second movable body 30.

The movable bodies 20 and 30 can be considered to be positioned on the same virtual line. Moreover, the ball screw shafts 61 and 71 can be considered parallel to the virtual line.

The first link member 40 has a base end (i.e., an end close to the pillar portion 80; the same applies below) and a tip end (i.e., an end close to the end-effector 50; the same applies below). The first link member 40 is connected at the base end to the second movable body 30 so as to be rotatable about the Y axis.

The second link member 41 has a base end and a tip end. The second link member 41 is connected at the base end to the second movable body 30 so as to be rotatable about the Y axis at a predetermined distance below the connection point between the second movable body 30 and the first link member 40. The length of the second link member 41 is equal to the length of the first link member 40.

The third link member 42 has an upper end and a lower end. The third link member 42 is connected at the upper end to the tip end of the first link member 40 so as to be rotatable about the Y axis. Moreover, the third link member 42 is connected at the lower end to the tip end of the second link member 41 so as to be rotatable about the Y axis. The distance between the connection point of the first link member 40 and the third link member 42 and the connection point of the second link member 41 and the third link member 42 is equal to the distance between the connection point of the first link member 40 and the second movable body 30 and the connection point of the second link member 41 and the second movable body 30 (hereinafter, referred to as distance Z1).

The fourth link member 43 has a base end and a tip end. The fourth link member 43 is connected at the base end to both the tip end of the first link member 40 and the upper end of the third link member 42 so as to be rotatable about the Y axis. Moreover, the fourth link member 43 is connected at the tip end to the end-effector 50 so as to be rotatable about the Y axis.

The fifth link member 44 has a base end and a tip end. The fifth link member 44 is connected at the base end to both the tip end of the second link member 41 and the lower end of the third link member 42 so as to be rotatable about the Y axis. Moreover, the fifth link member 44 is connected at the tip end to the end-effector 50 so as to be rotatable about the Y axis at distance Z1 below the connection point between the fourth link member 43 and the end-effector 50. The length of the fifth link member 44 is equal to the length of the fourth link member 43.

The first link member 40, the second link member 41, and the third link member 42 constitute a "first parallel link portion" 47 of the present invention. The first parallel link portion 47 has a base end and a tip end, and can be considered to be swingably connected at the base end to the second movable body 30.

The third link member 42, the fourth link member 43, and the fifth link member 44 constitute a "second parallel link portion" 48 of the present invention. The second parallel link portion 48 has a base end and a tip end, and can be considered to be swingably connected at the base end to the tip end of the first parallel link portion 47 and swingably connected at the tip end to the end-effector 50.

The sixth link member 45 has a base end and a tip end. The sixth link member 45 is connected at the base end to the first movable body 20 so as to be rotatable about the Y axis. Moreover, the sixth link member 45 is connected at the tip end to the fifth link member 44 at a first intermediate position 44a (see FIG. 2, etc.) so as to be rotatable about the Y axis. The sixth link member 45 can also be considered to be connected at the tip end to the second parallel link portion 48 at an intermediate position so as to be rotatable about the Y axis.

The seventh link member 46a has a base end and a tip end. The seventh link member 46a is connected at the base end to both the second movable body 30 and the base end of the second link member 41 so as to be rotatable about the Y axis. Moreover, the seventh link member 46a is connected at the tip end to the sixth link member 45 at a second intermediate position 45a (see FIG. 2, etc.) so as to be rotatable about the Y axis.

In the present embodiment, the first link member 40, the second link member 41, and the sixth link member 45 are parallel to one another, the fourth link member 43, the fifth link member 44, and the seventh link member 46a are parallel to one another, the third link member 42, a line defined on the second movable body 30 by connecting two rotation axes, and a line defined on the end-effector 50 by connecting two rotation axes are parallel to one another, the connection point between the seventh link member 46a and the second movable body 30 and the connection point between the sixth link member 45 and the first movable body 20 are equally distanced from the second intermediate position 45a (i.e., these two connection points and the second intermediate position 45a form an isosceles triangle), and further, the connection point between the fifth link member 44 and the end-effector 50 and the second intermediate position 45a are at the same position (height) in the Z direction. The connection point between the fifth link member 44 and the end-effector 50 and the second intermediate position 45a can be considered to lie in the same plane (XY plane), which is perpendicular to the Z direction.

The sixth link member 45 corresponds to the "first arm portion" of the present invention. Moreover, the seventh link member 46a corresponds to the "second arm portion" of the present invention.

Next, the relationship between the moving speeds of the movable bodies 20 and 30, driven by the linear motion units 60 and 70, and the moving speed of the end-effector 50 will be discussed.

In the parallel link mechanism 10A according to the present embodiment, the above relationship can be simply represented by the following equation.

$$\begin{bmatrix} v_x \\ v_z \end{bmatrix} = \begin{bmatrix} J_x & -J_x \\ J_z & J_z \end{bmatrix} \begin{bmatrix} \dot{d}_1 \\ \dot{d}_2 \end{bmatrix} \begin{bmatrix} J_x & 0 \\ 0 & J_z \end{bmatrix} \begin{bmatrix} \dot{d}_1 - \dot{d}_2 \\ \dot{d}_1 + \dot{d}_2 \end{bmatrix} \qquad (1)$$

where:
  $v_x$ is the X-direction moving speed [m/s] of the end-effector 50,
  $v_z$ is the Z-direction moving speed [m/s] of the end-effector 50,
  $\dot{d}_1$ is the moving speed [m/s] of the first movable body 20 driven by the first linear motion unit 60, and
  $\dot{d}_2$ is the moving speed [m/s] of the second movable body 30 driven by the second linear motion unit 70.

Equation (1) indicates that the X-direction moving speed $v_x$ of the end-effector 50 is determined by the difference between the moving speeds of the first and second movable bodies 20 and 30 $(=\dot{d}_1-\dot{d}_2)$, and that the Z-direction moving speed $v_z$ of the end-effector 50 is determined by the sum of the moving speeds of the first and second movable bodies 20 and 30 $(=\dot{d}_1-\dot{d}_2)$. That is, the parallel link mechanism 10A according to the present embodiment is a so-called differential mechanism.

Coefficient $J_x$, which is the X-direction reduction ratio, can be expressed as a function of the distance between the first and second movable bodies 20 and 30 $(=d_1-d_2)$, as shown in the following equation.

$$J_x = J_x(d_1 - d_2) \qquad (2)$$

where:
  $d_1$ is the displacement [m] of the first movable body 20 caused by the first linear motion unit 60, and
  $d_2$ is the displacement [m] of the second linear motion unit 70 caused by the second movable body 30.
The X-direction reduction ratio $J_x$ can be adjusted freely within a broad range by changing mechanism parameters, such as link length.

On the other hand, in the configuration shown in FIG. 1, coefficient $J_z$, which is the Z-direction reduction ratio, is ½ (a constant). That is, in the present embodiment, the average speed of the movable bodies 20 and 30 equals the Z-direction moving speed $v_z$ of the end-effector 50.

In this manner, the parallel link mechanism 10A according to the present embodiment allows coefficient $J_x$, the reduction ratio in the X direction, which is a non-gravitational direction, to be designed independently of coefficient $J_z$, the reduction ratio in the Z direction, which is the gravitational direction. That is, the parallel link mechanism 10A according to the present embodiment realizes gravitationally decoupled reduction (GDR).

Next, the relationship between the drive forces of the linear motion units 60 and 70 and the translational force of the end-effector 50 will be discussed.

In the case of the parallel link mechanism 10A according to the present embodiment, the above relationship can be expressed as in the following equation using the principle of virtual work based on the relationship in equation (1).

$$\begin{bmatrix} f_1 \\ f_2 \end{bmatrix} = \begin{bmatrix} J_x & J_z \\ -J_x & J_z \end{bmatrix} \begin{bmatrix} f_x \\ f_z \end{bmatrix} \qquad (3)$$

Solving this yields the following equation.

$$\begin{bmatrix} f_x \\ f_z \end{bmatrix} = \begin{bmatrix} 1/2J_x & 0 \\ 0 & 1/2J_z \end{bmatrix} \begin{bmatrix} f_1 - f_2 \\ f_1 + f_2 \end{bmatrix} \qquad (4)$$

where:
  $f_x$ is the X-direction translational force [N] of the end-effector 50,
  $f_z$ is the Z-direction translational force [N] of the end-effector 50,
  $f_1$ is the drive force [N] of the first linear motion unit 60, and
  $f_2$ is the drive force [N] of the second linear motion unit 70.

Equation (4) indicates that the X-direction translational force $f_x$ of the end-effector 50 is determined by the difference between the drive forces of the first and second linear motion units 60 and 70 $(=f_1-f_2)$, and that the Z-direction translational force $f_z$ of the end-effector 50 is determined by the sum of the drive forces of the first and second linear motion units 60 and 70 $(=f_1+f_2)$.

As described earlier, in the configuration shown in FIG. 1, coefficient $J_z$, which is the Z-direction reduction ratio, is ½ (a constant). Therefore, the following equation can be derived from equation (4).

$$f_z = f_1 + f_2 \qquad (5)$$

Equation (5) indicates that the sum of the drive forces $f_1$ and $f_2$ of the two linear motion units 60 and 70 acts directly as the Z-direction translational force $f_z$ of the end-effector 50. In other words, the equation indicates that the parallel link mechanism 10A according to the present embodiment realizes coupled drive.

In continuation of the above, the operation of the parallel link mechanism 10A according to the present embodiment will be described.

When the first and second linear motion units 60 and 70 are activated to move the first and second movable bodies 20 and 30 in the +Z direction (ascent) by the same amount, as shown in FIG. 2, the end-effector 50 also ascends by the same amount (see (A)→(B)→(C) in the figure). In contrast, when the first and second linear motion units 60 and 70 are activated to move the first and second movable bodies 20 and 30 in the −Z direction (descent) by the same amount, the end-effector 50 also descends by the same amount (see (C)→(B)→(A) in the figure). In both cases, the end-effector 50 does not move in the X direction at all.

When the first linear motion unit 60 is activated to cause the first movable body 20 to ascend by the same amount as the decent of the second movable body 30 caused by simultaneous activation of the second linear motion unit 70, as shown in FIG. 3, the end-effector 50 moves (away) in the +X direction (see (A)→(B)→(C) in the figure). In contrast, when the first linear motion unit 60 is activated to cause the first movable body 20 to descend by the same amount as the ascent of the second movable body 30 caused by simultaneous activation of the second linear motion unit 70, the end-effector 50 moves (closer) in the −X direction (see (C)→(B)→(A) in the figure). In both cases, the end-effector 50 does not move in the Z direction at all.

Naturally, when the end-effector 50 is moved in the X direction, it is not requisite for the first and second movable bodies 20 and 30 to move by the same amount in the opposite directions. For example, the end-effector 50 may be moved away by causing the first movable body 20 to ascend while keeping the second movable body 30 stationary. In this case, the end-effector 50 is also moved in the +Z direction. Alternatively, the end-effector 50 may be moved closer by causing the first movable body 20 to descend while keeping the second movable body 30 stationary. In this case, the end-effector 50 is also moved in the −Z direction.

As described above, the parallel link mechanism 10A according to the first embodiment realizes both gravitationally decoupled reduction (GDR) and coupled drive in the same gravitational direction (Z direction) and non-gravitational direction (X direction) simultaneously. In addition, the parallel link mechanism 10A achieves the effects of: (1) employing a pantograph structure to allow the end-effector 50 to move within a wider range (particularly in the X direction) compared to the conventional mechanism 100; and (2) employing a parallel link structure to enhance overall resistance to external forces compared to the conventional mechanism 100.

Second Embodiment

As shown in FIG. 4(A), a parallel link mechanism 10B according to a second embodiment of the present invention differs from the parallel link mechanism 10A (see FIG. 4(B)) in that a seventh link member 46b, which is shorter than the seventh link member 46a, is provided in place of the seventh link member 46a, the sixth link member 45 is connected to the fifth link member 44 at a position (first intermediate position 44b) closer to the base end than is the first intermediate position 44a, and the seventh link member 46b is connected to the sixth link member 45 at a position (second intermediate position 45b) closer to the base end than is the second intermediate position 45a.

This configuration achieves a lower X-direction reduction ratio, allowing the end-effector 50 to move in the X direction at a higher speed. On the other hand, the X-direction translational force of the end-effector 50 decreases.

Third Embodiment

As shown in FIG. 4(C), a parallel link mechanism 10C according to a third embodiment of the present invention differs from the parallel link mechanism 10A (see FIG. 4(B)) in that a seventh link member 46c, which is longer than the seventh link member 46a, is provided in place of the seventh link member 46a, the sixth link member 45 is connected to the fifth link member 44 at a position (first intermediate position 44c) closer to the tip end than is the first intermediate position 44a, and the seventh link member 46c is connected to the sixth link member 45 at a position (second intermediate position 45c) closer to the tip end than is the second intermediate position 45a.

This configuration achieves a higher X-direction reduction ratio, resulting in an increased X-direction translational force of the end-effector 50. On the other hand, the X-direction moving speed of the end-effector 50 decreases.

Fourth Embodiment

As shown in FIG. 5, a parallel link mechanism 10D according to a fourth embodiment of the present invention is configured by vertically inverting the parallel link mechanism 10A according to the first embodiment. This configuration also achieves the same effects as those of the first embodiment.

Variants

While the first through fourth embodiments of the parallel link mechanism according to the present invention have been described above, the present invention is not limited to these configurations.

Variant Related to Gravity Compensation

The parallel link mechanism according to the present invention may further include, for example, gravity compensation means. In the case where the movable bodies 20 and 30, a mechanism extending therefrom (for example, in the first embodiment, the link members 40, 41, 42, 43, 44, 45, and 46a and the end-effector 50), and a payload of the end-effector 50 (collectively referred to below as the "link members and other components") weigh m [kg] and are subjected to a gravitational acceleration of g [m/s$^2$], the gravity acting on the link members and other components is represented by $f_x=0$ and $f_2=-mg$, and by substituting these values into equation (3), the following equation is obtained.

$$f_1 = f_2 = -mgJ_z = -\frac{mg}{2} \qquad (6)$$

Accordingly, if a +Z-direction force corresponding to half the gravity on the link members and other components is applied to each of the linear motion units 60 and 70 or each of the movable bodies 20 and 30 through hardware or software, gravitational cancellation can be achieved regardless of the posture of the parallel link mechanism. In other words, gravity compensation can be achieved. Note that in the case where gravity compensation is implemented through hardware, for example, a constant-force spring (such as a tool balancer or a CONSTON spring) with an output of mg/2 is provided between the ceiling section 82 of the pillar portion 80 and each of the first and second movable bodies 20 and 30.

It should be noted that when the connection point between the seventh link member 46a (46b, or 46c) and the second movable body 30 and the connection point between the sixth link member 45 and the first movable body 20 are not equally distanced from the second intermediate position 45a (45b, or 45c), coefficient J$_z$ takes a value different from 1/2, with the result that the force that is to be exerted on the first linear motion unit 60 (or the first movable body 20) and the force that is to be exerted on the second linear motion unit 70 (or the second movable body 30) are not in a 1:1 ratio.

The aforementioned gravity compensation can be simplified by using a configuration in which the fourth and fifth link members 43 and 44 are lengthened by the same amount such that the height of the connection point between the fifth link member 44 and the end-effector 50 coincides with the height of the connection point between the first movable body 20 and the sixth link member 45 (for example, as in parallel link mechanisms 10E and 10F shown in FIG. 6). The reasons for this will be described below.

For the configuration as shown in FIG. 6, equation (1) is rewritten as follows. Note that for this configuration, coefficient J$_z$, the Z-direction reduction ratio, is 1 instead of ½.

$$\begin{bmatrix} v_x \\ v_z \end{bmatrix} = \begin{bmatrix} J_x & -J_x \\ J_z & 0 \end{bmatrix} \begin{bmatrix} \dot{d}_1 \\ \dot{d}_2 \end{bmatrix} = \begin{bmatrix} J_x & 0 \\ 0 & J_z \end{bmatrix} \begin{bmatrix} \dot{d}_1 - \dot{d}_2 \\ \dot{d}_1 \end{bmatrix} \qquad (1)'$$

Using equation (1)', equation (3) is rewritten as follows.

$$\begin{bmatrix} f_1 \\ f_2 \end{bmatrix} = \begin{bmatrix} J_x & J_z \\ -J_x & 0 \end{bmatrix} \begin{bmatrix} f_x \\ f_z \end{bmatrix} \qquad (3)'$$

Substituting the gravity on the aforementioned link members and other components ($f_x=0$ and $f_2=-mg$) into equation (3)' yields equation (6)'.

$$\begin{cases} f_1 = -mgJ_z = -mg \\ \qquad f_2 = 0 \end{cases} \qquad (6)'$$

Equation (6)' indicates that by directly applying a +Z direction force corresponding to the gravity on the link members and other components to the linear motion unit 60 or the movable body 20, gravitational cancelation can be achieved regardless of the posture of the parallel link mechanism. Specifically, the configuration as shown in FIG. 6 requires only one constant-force spring for gravity compensation, resulting in a simplified mechanism.

It should be noted that solving equation (3)' yields equation (4)'.

$$\begin{bmatrix} f_x \\ f_z \end{bmatrix} = \begin{bmatrix} -1/J_x & 0 \\ 0 & 1/J_z \end{bmatrix} \begin{bmatrix} f_2 \\ f_1 + f_2 \end{bmatrix} \qquad (4)'$$

Equation (4)' indicates that $f_1$ does not affect $f_x$ but only affects $f_z$. Moreover, from equation (4)', the aforementioned equation (5) can be derived. This means that the configuration as shown in FIG. 6 also realizes coupled drive similar to that in the first and other embodiments.

Other Variants

The base portion 90 may further include a third rotation device with an output shaft thereof connected to the bottom section 81 of the pillar portion 80 (the third rotation device is omitted in the illustrations of FIG. 1). This configuration allows the pillar portion 80 to rotate about the Z axis, resulting in an increased movable range of the end-effector 50.

In the first through fourth embodiments, it is assumed that the X and Y directions are horizontal, and that the Z direction corresponds to the direction of gravity, but this is not limiting, and for example, the X or Y direction may correspond to the direction of gravity.

It should be noted that, up to this point, the linear motion means has been assumed to consist of the first and second ball screw shafts parallel to the virtual line, but the linear motion means is not limited to the ball screws and may consist of other components such as leadscrews, racks and pinions, "Liner Unit" linear drive devices, or linear shaft motors. When leadscrews, which have high friction and low transmission efficiency, are intentionally chosen instead of ball screws, which have low friction and high transmission efficiency, the linear motion actuator has a so-called self-locking function and does not perform reverse drive unless an active drive force is applied. However, the self-locking function is often advantageous for heavy load transportation, and therefore in such a case, leadscrews can be chosen.

Naturally, similar locking functions can also be realized by configurations using linear motion means, such as ball screws, and (electromagnetic) brakes or suchlike attached to motors for rotationally driving the linear motion means. In such a case, it is necessary to attach additional components, such as the brakes, but for example, it is possible to obtain an output shaft locking function while using ball screws with high transmission efficiency.

DESCRIPTION OF THE REFERENCE CHARACTERS

10A, 10B, 10C, 10D parallel link mechanism
20 first movable body
30 second movable body
40 first link member
41 second link member
42 third link member
43 fourth link member
44 fifth link member
44a, 44b, 44c first intermediate position
45 sixth link member (first arm portion)
45a, 45b, 45c second intermediate position
46a, 46b, 46c seventh link member (second arm portion)
47 first parallel link portion
48 second parallel link portion
50 end-effector
60 first linear motion unit
61 first ball screw shaft
62 first reduction device
63 first rotation device
70 second linear motion unit
71 second ball screw shaft
72 second reduction device
73 second rotation device
80 pillar portion
81 bottom section
82 ceiling section
83 back wall
84 side wall
85 side wall
90 base portion

The invention claimed is:

1. A parallel link mechanism comprising:

a first movable body and a second movable body positioned on the same virtual line;

a first parallel link portion having a first base end and a first tip end and swingably connected at the first base end to the second movable body;

a second parallel link portion having a second base end and a second tip end and swingably connected at the second base end to the first tip end of the first parallel link portion;

a first arm portion having a third base end and a third tip end, rotatably connected at the third base end to the first movable body, and rotatably connected at the third tip end to the second parallel link portion at a first intermediate position between the second base end and the second tip end;

a second arm portion having a fourth base end and a fourth tip end, rotatably connected at the fourth base end to the second movable body, and rotatably connected at the fourth tip end to the first arm portion at a second intermediate position between the third base end and the third tip end; and linear motion means capable of moving the first movable body and the second movable body individually along the virtual line, wherein, the first parallel link portion includes a first link member rotatably connected at one end to the second movable body, a second link member rotatably connected at one end to the second movable body, and a third link member connected to other ends of the first and second link members, the second parallel link portion includes a fourth link member and a fifth link member, with the fourth link member being rotatably connected at one end to the other end of the first link member and rotatably connected at another end to an end-effector, and the fifth link member being rotatably connected at one end to the other end of the second link member and rotatably connected at another end to the end-effector, the first link member, the second link member, and the first arm portion are parallel to one another, the fourth link member, the fifth link member, and the second arm portion are parallel to one another, the third link member, a line defined on the second movable body by connecting two rotation axes, and a line defined on the end-effector by connecting two rotation axes are parallel to one another, distancing between the fourth base end and the fourth tip end is equal to distancing between the third base end and the second intermediate position, and the fifth link member and the end-effector are connected at a point in the same plane as the second intermediate position, the plane being perpendicular to the virtual line.

2. The parallel link mechanism according to claim 1, wherein, the linear motion means includes:

a first ball screw shaft and a second ball screw shaft parallel to the virtual line; and a first rotation device and a second rotation device connected one-to-one with the first ball screw shaft and the second ball screw shaft, respectively, the first ball screw shaft is threaded in the first movable body but not in the second movable body, and the second ball screw shaft is threaded in the second movable body but not in the first movable body.

3. The parallel link mechanism according to claim 2, further comprising:

a base portion placed on a floor surface; and a pillar portion extending vertically upward from the base portion and including the linear motion means.

4. The parallel link mechanism according to claim 3, wherein the base portion includes a third rotation device connected to the pillar portion.

5. The parallel link mechanism according to claim 3, further comprising:

a first constant-force spring exerting a constant vertically upward force on the first movable body regardless of displacement of the first movable body; and a second constant-force spring exerting a constant vertically upward force on the second movable body regardless of displacement of the second movable body.

*  *  *  *  *